Patented Aug. 8, 1939

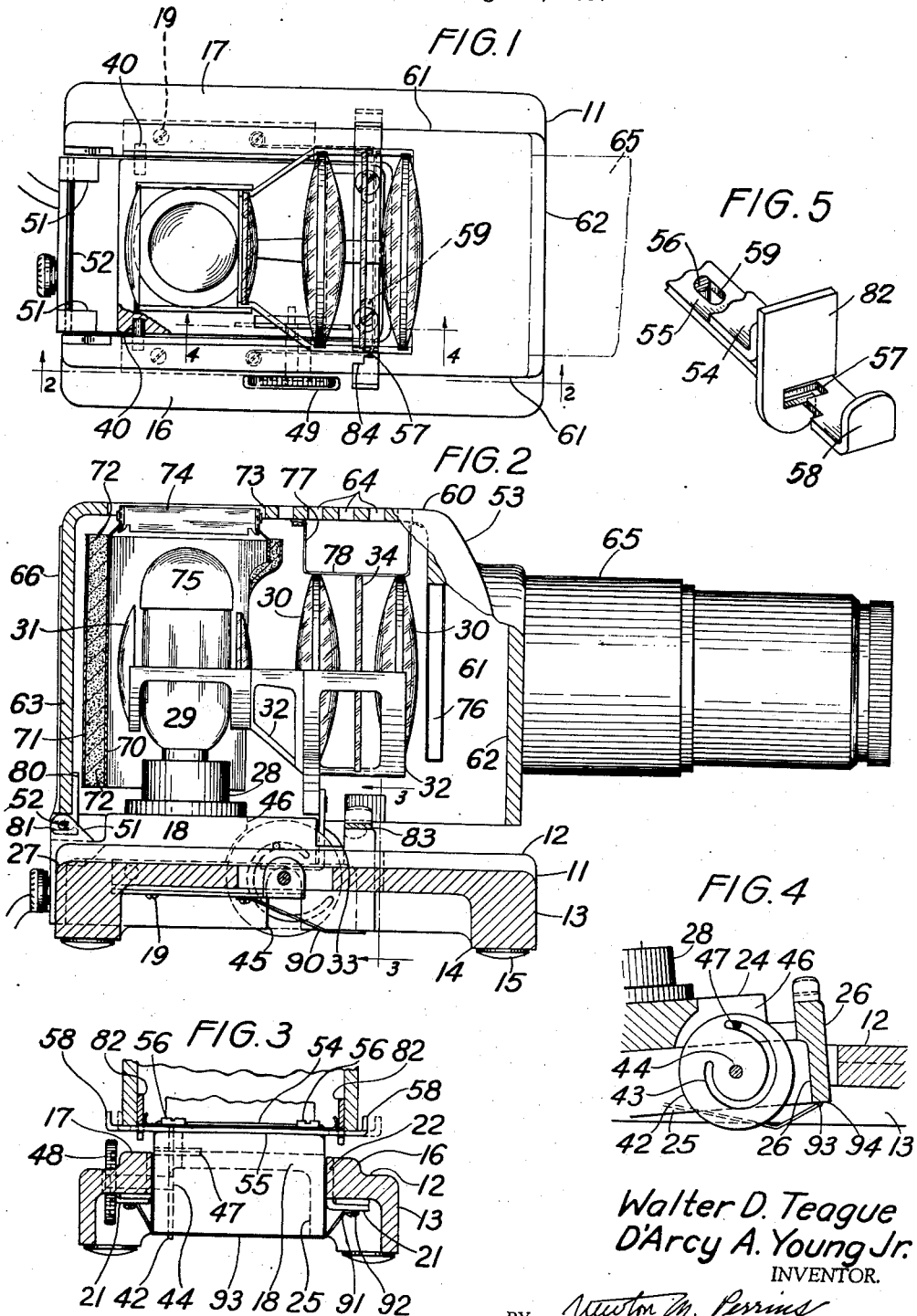

2,169,010

UNITED STATES PATENT OFFICE 2,169,010

STILL PROJECTOR

Walter D. Teague, New York, and D'Arcy A. Young, Jr., Rochester, N. Y., assignors to Eastman Kodak Company, Rochester, N. Y., a corporation of New Jersey Application August 14, 1937, Serial No. 159,144

4 Claims. (Cl. 88—24)

The present invention relates to projectors, and more particularly to projectors intended for use with 35 mm. or miniature transparency positives.

An object of the invention is the provision in such a projector, of a lamphousing which is detachable so that it may be readily removed to permit access to the lamp and to certain of the optical members.

Another object is the provision of a lamphouse which is movable as a unit with the optical members of the projector so as to always maintain the various optical members in the proper alignment.

Still another object of the invention is the provision in such a projector, of a mechanism which easily and quickly raises or lowers the optical axis of the projector, and which maintains the various parts in adjusted position.

A further object is the provision of a projector of the class described, which is simple in construction, positive in its action, easy to operate, and which affords ready access to certain of the parts.

To these and other ends, the invention resides in certain improvements and combinations of parts all as will be hereinafter more fully described, the novel features being pointed out in the claims at the end of the specifications.

In the drawing:

Fig. 1 is a plan view of the projector with the lamphousing structure and the objective shown in broken lines;

Fig. 2 is a side elevation partly in section of the projector taken substantially on the line 2—2 of Fig. 1 with the lamphousing in position, showing the arrangement for detachably securing the lamphouse, and showing the mechanism for raising or lowering the optical axis of the projector;

Fig. 3 is a fragmentary vertical sectional view of the lower part of the projector, taken substantially on the line 3—3 of Fig. 2, showing the means for detachably securing the lamphouse in position, and the arrangment of the elevating mechanism for the lamp supporting member and the lamphousing; and Fig. 4 is a fragmentary vertical sectional view taken substantially on the line 4—4 of Fig. 1, with the lamp supporting member in raised position, and showing the cam for raising and lowering the lamp supporting member and the lamp housing as a unit, the condenser lenses and their supporting frame have been omitted for the purpose of clarity.

Fig. 5 is a perspective view of a portion of the machine illustrated in Fig. 2, but on a larger scale than the latter, showing the arrangement for locking the lamphousing to the pivoted support.

Similar reference numerals throughout the several views indicate the same parts.

The invention comprises, in its broadest aspect, a base on which a supporting member is pivotally mounted about a horizontal axis so that a portion thereof may be raised or lowered relative to the base for changing the optical axis of the projector. This supporting member carries the condenser lenses as well as a light source in the form of an incandescent lamp. A lamp housing is mounted on and movable as a unit with this supporting member, and carries the objective lens system of the projector. The lamp housing is releasably secured to the supporting member so that it may be easily detached therefrom to permit ready access to the lamp as well as the condenser lenses. A slotted cam mounted on the base cooperates with a cam follower or pin carried by the supporting member so that the latter, together with the lamphousing, may be raised or lowered relative to the base to adjust the vertical position of the optical axis of the projector.

Referring now to the drawing, there is shown a projector constructed in accordance with the preferred embodiment of the invention. This invention comprises, in general, a base 11 formed of any suitable material, preferably Bakelite, having a flat top 12 and depending side and end walls 13 so as to provide a hollow dish-like member, as shown in Figs. 2 and 3. The corners of the base are formed with short depending members or feet 14 which may be provided with suitable cushions or pads 15, preferably of felt or other similar material. The base 11 is preferably of U-shape having spaced arms or members 16 and 17 to which a supporting member 18, hereinafter more fully described, is pivotally mounted. Each of the arms 16 and 17 has secured thereto, by means of screws 19, a metal angle-iron one leg 21 of which extends under the arm 16 or 17 while the other leg 22 thereof extends up along the inner surface of the arm, as clearly shown in Fig. 3.

The supporting member 18 is also preferably formed of Bakelite to provide a flat top 24 depending side walls 25 and depending front and back walls 26 and 27 respectively. The top 24 preferably extends substantially across the space between the arms 16 and 17, as shown in Fig. 1, while the side walls 25 extend downwardly therebetween, as shown in Fig. 3. The top 24 has mounted thereon a lamp socket 28 in which an incandescent lamp 29 is mounted in the usual and well-known manner. The condensing lenses 30 and the reflector 31 are all carried in a single unitary frame member 32 mounted on an angle iron 33 which in turn is suitably secured to the under side of the top 24, as shown in Fig. 2. A heat resisting member 34 is preferably interposed between certain of the condenser lenses, as shown in Fig. 2.

The opposite side walls 25 of the support 18 have laterally projecting bearing pins 40 which extend outwardly from the walls 25 and are journalled in registering openings formed in the vertical legs 22 of the angle irons, thus affording bearings in which the pins 40 are loosely mounted. These bearing pins are positioned adjacent the rear of the support 18, as shown in Figs. 1 and 2, and provide pivot points for mounting the support 18 on the base 11 so that the support may be raised or lowered, by mechanism to be later described, to move the optical axis of the projector so that the image area of the transparency may be centered on a projection screen, as is well known.

A thin circular cam 42, having a spiral slot 43 formed therein, is mounted on the inner end of a shaft 44 which is journalled in the arm 16 of the base 11, and extends through an opening 45 formed in the adjacent side wall 25 of the member 18. The cam 42 lies adjacent the inner face of this side wall, and projects upwardly into a slot 46 formed in the top 24 of the member 18, as shown in Fig. 3. A metal pin or cam follower 47 is imbedded in the member 18 and extends across the slot 46 and through the slot 43 of the cam 42 so that upon rotation of the cam the pin will ride on the edges of the cam slot to raise or lower the support 18, as is apparent from inspection of Figs. 2 and 4. The cam is rotated by means of a hand controlled knob 48 which is secured to the outer end of the shaft 44 and projects upwardly into operating position through an aperture 49 formed in the base 11, as clearly illustrated in Figs. 1 and 3.

The top of the support 18 has formed integral therewith a pair of spaced bearings 51 positioned at the rear upper edge of the support, as shown in Figs. 1 and 2. These bearings carry a small rod or pintle 52, which engages cooperating members of the lamphousing, generally indicated as 53 and hereinafter more fully described, to detachably secure the lamphousing to the pivoted support 18. The forward end of the support carries an upper stationary bar 54 and a lower sliding bar 55 both of which are secured to the member 18 by means of screws 56, as best shown in Figs. 1 and 3. The screws 56 extend through slots 59 in the lower bar 55 so that the latter may be moved or slid laterally relative to the top stationary bar 54, as is apparent from an inspection of Fig. 5. The lower sliding bar 55 is formed with a pair of rearwardly extending spaced open end slots 57, only one of which is shown in Fig. 5, which are arranged to receive cooperating lugs on the lamphousing to lock the latter to the support, in a manner to be presently described. The ends 58 of the sliding bar 55 are preferably bent upwardly, as shown in Fig. 3, to form gripping portions to slide the bar.

The lamphouse 53 is of the shape best shown in Fig. 2, and is also preferably formed of Bakelite to provide a top 60, sides 61, a front 62 and a back 63. The top 60 is provided with louvres 64 through which the heat from the lamp 29 may escape, as is well known. The front 62 has secured thereto a tube 65, preferably Bakelite, which carries the usual objective lens of the projector. The sides and back of the lamphousing are preferably fluted, as shown at 66 Fig. 2, to assist in radiating any heat transmitted by the lamp 29. However, in order to reduce the radiation of the lamp, the latter is preferably enclosed in a U-shaped case or shield arranged on three sides of the lamp, the side toward the condensing lens, of course, being open so that light rays may pass through the optical members of the projector. This supporting case comprises U-shaped metal wall members 70 and 71 which are separated by a lining of suitable heat insulating material 72, such, for example, as glass wool, all of which is clearly shown in Fig. 2.

This insulating shield is preferably secured to and movable as a unit with the lamphousing and extends into a registering opening 73 formed in the top 60 in the lamphousing. Top louvres 74 are also provided in the top of the insulated casing so as to provide an exit for the heat generated by the lamp 29. A black metal cap 75 is preferably positioned over the top of the lamp 29 to reduce the light rays which may pass through the louvres 74, as is well known. The opposite sides 61 of the lamphousing are formed with aligned slots 76 in which a transparency holding slide, not shown, is arranged to be moved back and forth through the optical field of the projector, so as to bring the various transparencies into position in the optical field, as is well known to those in the art.

The top 60 of the lamphousing also preferably carries a depending flexible member in the form of a U-shaped spring, the legs 77 of which are secured to the under side of the top 60 in any suitable manner. The intermediate portion 78 of the spring extends over the top of the condenser lenses 30 and the member 34, as shown in Fig. 2, and presses lightly thereon to resiliently retain these members in position in the frame member 32.

Referring now to Fig. 2, the lower edge of the back 63 of the lamphousing has secured thereto, in any suitable manner, metal lugs 80 each of which is formed with a rearwardly extending open end slot 81 adapted to receive the pintle 52 to detachably secure the lamphousing to the support 18. The lower edge of each of the sides 61 of the lamphousing is also provided with a similar metal lug 82 having a forwardly extending open end slot 83 which is in registry with the slot 57 formed in the sliding bar 55 when the latter is in the position shown in Fig. 5. When, however, the sliding bar 55 is moved to its dotted position shown in Fig. 3, the slot 57 is moved out of registry with the slot 83 of the lug 82, and the latter is locked in position to secure the lamphousing to the support 18. When the slot 83 is thus closed, the screws 56 engage the ends of the slots 59 to limit the lateral movement of the bar 55 so as to space the finger or gripping portion 58 from the slide wall 61 of the lamphousing, as is apparent from an inspection of Fig. 5. The bars 54 and 55 thus cooperate with the pintle 52 to detachably secure the lamphousing on the support 18. When the housing is thus secured, the entire projector may be picked up by means of the lens tube 65, so that the latter also forms a handle by which the projector may be carried or moved.

When the lamp 29 is to be replaced, or the condenser lenses 30 are to be cleaned, the lamphousing may be readily detached from the supporting means to provide complete access to the lamp and lenses. To remove the housing, the sliding bar 55 is first slid from the dotted position to the full line position shown in Fig. 3, thus bringing the slot 57 thereof into registry with the slot 83 of the lug 82. The housing 53 is then tipped slightly upward about the pintle 52, and is then moved forwardly to slide the pintle 52 out of the slots 81 of the lugs 80. The housing is now free, and may be removed by lifting it vertically. Free access is now provided both to the lamp and to the condenser lenses. When, however, the housing is to be replaced, it is first moved downwardly over the lamp and lens assembly until the slots 81 are in alignment with the pintle 52, the front end of the housing being slightly elevated. The housing is then slid rearwardly to bring the pintle 52 into slots 81 of the lugs 80. The front end of the housing is then slightly depressed to move the slots 83 of the lugs 82 into registry with the slots 57 of the sliding bar 55. The latter is then slid to the right, as viewed in Fig. 3, to lock the housing to its support 18, as above described.

Referring again to Fig. 2, it is apparent that when the cam 42 is rotated in clockwise direction, the pin or cam follower 47 will engage the edges of the cam slots 43 to elevate the front of the support 18 and the lamphousing 53 to raise the optical axis of the projector. When, however, the cam 42 is rotated in the opposite direction, the support and lamphouse are moved downwardly to lower the optical axis of the projector. In this raising and lowering operation, the support 18 and the lamphousing 53 move as a unit on the pivot or bearing pins 40 so that the optical members of the projectors are always maintained in proper alignment. It is apparent that due to the weight of the support 18 and the lamphousing 53, more force must be applied to the knob 48 in the elevating operation than in the lowering operation. It is desirable, however, in a machine of this type that the force necessary to both raise and lower the support be substantially equal, or nearly so.

To this end, the present invention provides an arrangement which assists the cam 42 in the elevating operation, but which tends to act against the cam in the lowering movement. This arrangement comprises, in the present embodiment, a U-shaped counter-balance spring 90 the ends 91 of which are secured by screws 92 to the under side of the legs 21 of the angle irons as clearly shown in Figs. 2 and 3. An intermediate portion 93 of the spring 90 engages the lower edge 94 of the front wall 26 of the support 18, as shown in Figs. 2 and 4 and tends to lift the support 18 and the lamphousing 53 as a unit, as is apparent from inspection of the drawing. Thus when the cam 42 is rotated to elevate the support in the lamphousing, the spring 90 cooperates with the cam to assist in this elevating movement; but, when the cam is rotated in the opposite direction to lower the members, the spring tends to hold these members in elevated position. By means of this arrangement, the spring 90 effectively balances out the weight of the support 18 and the housing 53 so that the force for raising and lowering these members is substantially equal, the advantage of which is obvious.

It is apparent from the above description, that the present invention provides a projector construction in which the lamphousing is securely locked in position, yet may be readily and easily released and removed to afford free access to the lamp and the condenser lens assembly. It is also apparent that the optical axis of the projector may be quickly and easily raised or lowered so as to center the image of the projected transparencies on the viewing screen. In this raising and lowering operation, all of the optical members are moved as a unit thus positively assuring that these members will always be maintained in proper alignment.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the invention or the scope of the appended claims.

We claim:

1. In an apparatus for projecting transparencies, a base, a support pivotally secured adjacent one end thereof to said base, a lamp carried by said support, a lamp housing mounted on and movable with said support, a slotted lug secured to and depending from said lamphousing, a slotted bar slidably mounted on said support, said bar being movable into one position to bring the slot therein into registry with the slot in said lug to permit removal of said lamphousing from said support, said bar being slidable to another position to move the slot therein out of registry with the slot in said lug to lock said lamphousing on said support, and means engaging said support adjacent the other end thereof to adjust said support and said housing relative to said base.

2. In an apparatus for projecting transparencies, a base, a support adjustably mounted on said base, a lamp carried by said support, a condenser lens mounted on said support and movable therewith, a lamp housing detachably secured to said support, a U-shaped spring secured to and movable with said lamphouse and formed with a portion arranged to engage said lens independently of said support but cooperating therewith to maintain said lens in position, means for adjusting said support and said housing relative to said base, and a counterbalance member operatively connecting portions of said base and said support and cooperating with said means to facilitate adjustment of said support.

3. In an apparatus for projecting transparencies, a base, a supporting member pivotally secured adjacent one end thereof to said base, a lamp carried by said support, a frame member mounted on said support, a condensing lens and a lamp reflector supported in said frame member; a housing member mounted on said support and movable as a unit therewith, a spring on said housing adapted to engage said lens to yieldably retain the latter in position in said frame member, lugs on said housing member, said lugs being formed with open end slots, a pintle on said support adjacent said one end and arranged to be positioned in the slots of certain of said lugs, a slidable member comprising a flat metal strip slidably mounted on the opposite end of said support, said slidable member being movable in one direction to close the slots in others of said lugs and to cooperate with said pintle to lock said housing on said support, said slidable member being also movable in the opposite direction to open said last mentioned slots to enable said housing to be detached from said support, a cam on said base engaging said support adjacent said other end to adjust said support and said housing members relative to said base, and an operating knob for said cam mounted on said base.

4. In an apparatus for projecting transparencies, a base, a supporting member pivotally secured adjacent one end thereof to said base, a lamp and optical members carried by said support, a housing member mounted on said support and movable as a unit therewith, a spring secured to and movable with said housing member and arranged to engage certain of said optical members to yieldably retain the latter in position on said support and in alignment with the optical axis of said lamp, lugs on said housing member, said lugs being formed with open end slots, a pintle on said support adjacent said one end and arranged to be positioned in the slots of certain of said lugs, a slidable member comprising a flat metal strip slidably mounted on the opposite end of said support adapted to close the slots in others of said lugs and cooperating with said pintle for detachably securing said housing member to said support, a cam on said base engaging said support adjacent said other end to adjust said support and said housing members relative to said base, a counterweight spring secured to said base and having an intermediate portion thereof engaging said support adjacent said other end, said spring cooperating with said cam in adjusting said support and a hand-control knob for said cam mounted on said base.

WALTER D. TEAGUE.
D'ARCY A. YOUNG, Jr.